United States Patent
McDonald et al.

(10) Patent No.: US 6,408,405 B1
(45) Date of Patent: Jun. 18, 2002

(54) SYSTEM AND METHOD FOR DISPLAYING AND ANALYZING RETRIEVED MAGNETIC TAPE STATISTICS

(75) Inventors: Kathryn Ann McDonald, Yorba Linda; Ralph Ernest Marsh, III, Canyon; Willis Lloyd Jacobs, Mission Viejo, all of CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/209,983

(22) Filed: Dec. 10, 1998

(51) Int. Cl.[7] .................. H02H 3/05; H03K 19/003
(52) U.S. Cl. .................. 714/39; 714/38; 714/42
(58) Field of Search .................. 714/39, 38, 42, 714/48, 49, 52, 54, 700, 701, 702, 6, 25, 37, 57, 771, 703, 704, 706, 708

(56) References Cited

U.S. PATENT DOCUMENTS

| | | | | |
|---|---|---|---|---|
| 4,352,166 A | * | 9/1982 | Schoonover | 367/69 |
| 5,293,618 A | * | 3/1994 | Tandai et al. | 395/650 |
| 5,613,082 A | * | 3/1997 | Brewer et al. | 395/404 |

OTHER PUBLICATIONS

P.J. Ferguson, D.L. Johnston and J.V. Smalley, "Error Log Analysis" Nov. 1980, IBM Technical Disclosure Bulletin, vol. 23, No. 6.*

E.W. Emerick, L.A. Neeley and J.V. Smalley, "Error Log Analysis" May 1981, IBM Technical Disclosure Bulletin, vol. 23, No. 12.*

* cited by examiner

*Primary Examiner*—Peter S. Wong
*Assistant Examiner*—Tim Vo
(74) *Attorney, Agent, or Firm*—Alfred W. Kozak; Mark T. Starr; Lise A. Rode

(57) ABSTRACT

Using the accumulated magnetic tape statistics in a storage medium (Sumlog File) which were retrieved from the unloading of specifically selected magnetic tape media, of a magnetic tape peripheral, a procedure is instituted to take the tape statistics through a Log Analyzer unit to analyze certain pages of data which then is fed to a Jobformatter unit which organizes each page of data into Write errors, Read errors, and other tape statistics returned by the tape peripheral. The Jobformatter sets-up a display of this information onto a display terminal or a printer.

3 Claims, 13 Drawing Sheets

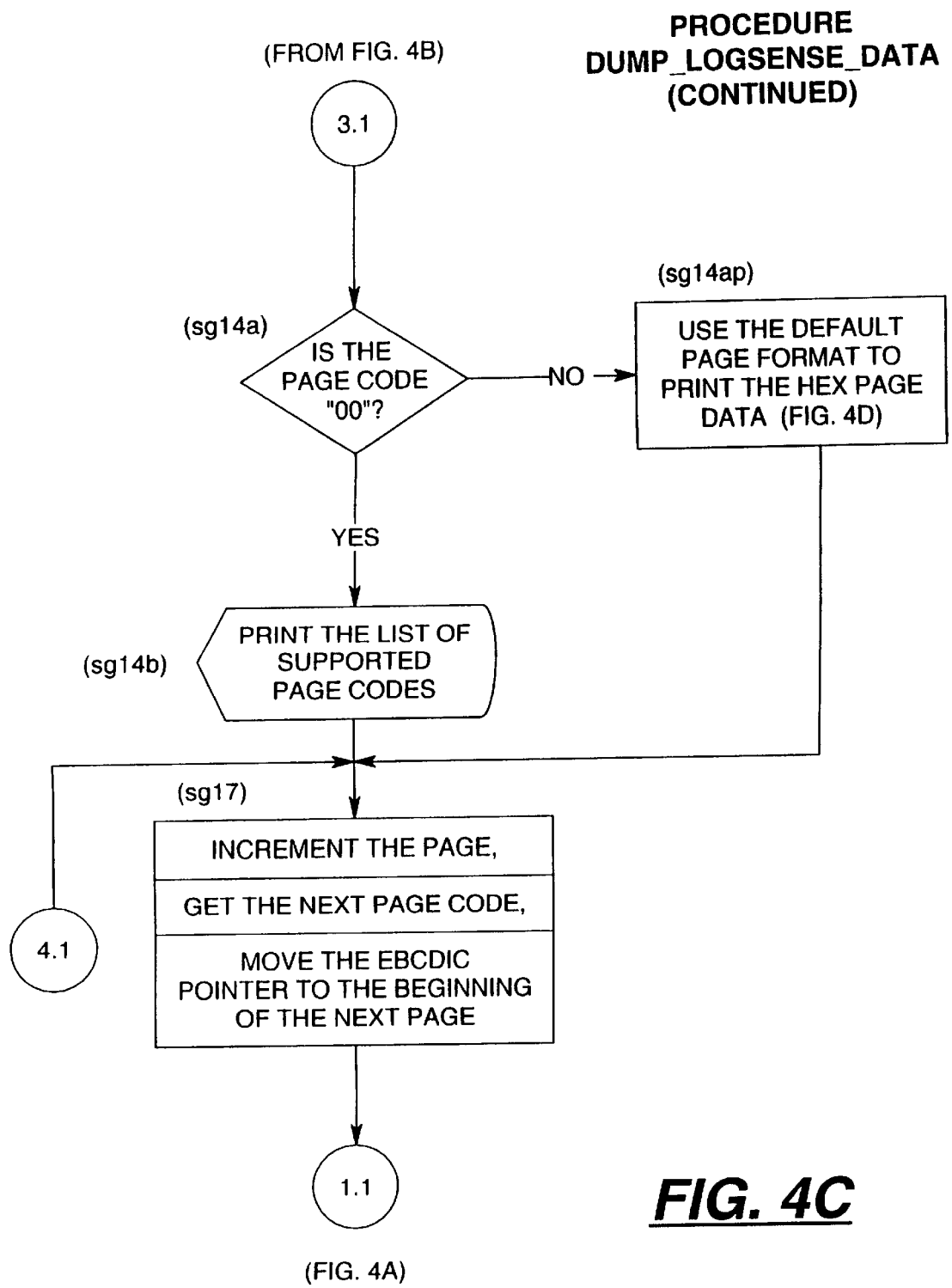

FIG. 5

An example of the statistical data displayed for an OST5136 tape follows:

```
                                              P1
A1 —► Log Sense Data
         Page 00 [00000006]: Supported Pages -> 00 02 03 0C 31 3E
A2 —►   Page 02 [02000084]: Write Errors   ╱S4      ╱—S6
   S3 —►   00006008  0000000000000001, 00016008 0000000000000000,
   S5 —►   00036008  0000000000000003, 00056008 000000000102C562,
            90006008 0000000001644098, 90016008 0000000000000000,
            90026008 0000000000000000, 90036008 000000000000007B,
            90046008 0000000000000007, 90056008 0000000000000000,
            90066008 00000000000002E4
A3—►    Page 03 [03000078]: Read Errors
            00006008 0000000000000000, 00016008 0000000000000000,
            00036008 0000000000000003, 00056008 0000000000000186,
            90106008 00000000000000F0, 90116008 0000000000000001,
            90126008 0000000000000000, 90136008 0000000000000000,
            90146008 0000000000000003, 90156008 0000000000000000,
A4—►    Page 0C [0C00003C]: Sequential-Access Device Page
            00006008 0000000001644002, 00016008 000000000102C562,
            00026008 0000000000000186, 00036008 00000000000000F0,
            01006008 0000000000000000
A5 —►Page 31 [310000D8]: Track Error Statistics
            90016008 0000000000000001, 90026008 0000000000000000,
            90036008 0000000000000000, 90046008 0000000000000000,
            90056008 0000000000000000, 90066008 0000000000000000,
            90076008 0000000000000000, 90086008 0000000000000000,
            90096008 0000000000000000, 900A6008 0000000000000000,
            900B6008 0000000000000000, 900C6008 0000000000000000,
            900D6008 0000000000000000, 900E6008 0000000000000000,
            900F6008 0000000000000000, 90106008 0000000000000000,
            90116008 0000000000000000, 90126008 0000000000000000,
A6 —►Page 3E Return All Pages not logged
```

STATISTICAL DATA PAGE 00 HAS THE FOLLOWING FORMAT:

| |
|---|
| PAGE HEADER (4 BYTES)<br>• BYTE 1: PAGE CODE<br>• BYTE 2: DONT' CARE<br>• BYTES 3-4: PAGE LENGTH |
| PAGE DATA (PAGE LENGTH BYTES)<br>• BYTE 1: PAGE CODE 00<br>• BYTE 2: PAGE CODE OF NEXT PAGE SUPPORTED<br>• . . .<br>• BYTE X: PAGE CODE OF LAST PAGE SUPPORTED |

_Fig. 6_

THE FOLLOWING INFORMATION EXPLAINS THE PAGE AND
PARAMETER CONTENTS FOR AN OST5136 DRIVE

PAGE 00h - SUPPORTED PAGES

BYTE 4-END PAGE, LIST OF PAGES SUPPORTED BY THE DRIVE

PAGE 02h - WRITE ERROR COUNTER

| PARAMETER CODE | MEANING |
| --- | --- |
| 0000h | WRITE ERRORS RECOVERED BY ECC |
| 0001h | WRITE ERRORS DETECTED BY FIRMWARE |
| 0003h | TOTAL WRITE BLOCKS CORRECTED BY INTERNAL ERROR RECOVERY ACTIONS |
| 0005h | TOTAL BYTES WRITTEN |
| 9000h | BYTES TRANSFERRED FROM INITIATOR |
| 9001h | HOST WRITE DATA RETRANSMISSIONS REQUIRED FOR OTHER THAN SCSI INTERFACE ERRORS |
| 9002h | HOST WRITE BLOCKS RECOVERED BY USE OF INTERNAL RECOVERY BUFFER |
| 9003h | TOTAL BLOCKS WRITTEN |
| 9004h | TOTAL TAPEMARKS WRITTEN |
| 9005h | ERASE GAPS DUE TO RETRY |
| 9006h | HOST BLOCKS WRITTEN INTO AN EDRC SUPERBLOCK |

*Fig. 8*

PAGE 03h - READ ERROR COUNTER

| PARAMETER CODE | MEANING |
|---|---|
| 0000h | READ ERRORS RECOVERED BY ECC |
| 0001h | READ ERRORS DETECTED BY FIRMWARE |
| 0003h | TOTAL WRITE BLOCKS CORRECTED |
| 0005h | TOTALREAD (FORWARD BYTES |
| 9010h | BYTES TRANSFERRED TO INITIATOR |
| 9011h | TOTAL READ BLOCKS RECORDED IN EDRC FORMAT |
| 9012h | TOTAL TAPE MARKS READ |
| 9013h | TOTAL READ BLOCKS NOT RECORDED IN EDRC FORMAT |
| 9014h | TOTAL HOST BLOCKS CONTAINED IN PHYSICAL BLOCKS READ FROM TAPE |
| 9015h | READ RETRIES |

*Fig. 9*

PAGE 0Ch - SEQUENTIAL ACCESS DEVICE

| PARAMETER CODE | MEANING |
|---|---|
| 0000h | WRITE DATA BYTES RECEIVED FROM INITIATOR |
| 0001h | DATA BYTES WRITTEN TO TAPE |
| 0002h | DATA BYTES READ FROM TAPE |
| 0003h | READ DATA BYTES SENT TO THE INITIATOR |
| 0100h | CLEANING REQUIRED |

PAGE 31h - TRACK ERROR STATISTICS

| PARAMETER CODE | MEANING |
|---|---|
| 90xxh | ECC CORRECTABLE READ/WRITE ERRORS DETECTED ON TRACK xx<br>[1 < = xx < = 18] |

PAGE 3Eh - RETURN ALL SUPPORTED PAGES

NOT REQUESTED BECAUSE OF THE EXORBITANT SIZE OF BUFFER REQUIRED

*Fig. 10*

SYSTEM AND METHOD FOR DISPLAYING AND ANALYZING RETRIEVED MAGNETIC TAPE STATISTICS

CROSS REFERENCES TO RELATED APPLICATIONS

This application is related to a co-pending companion application U.S. Ser. No. 09/209,985 now U.S. Pat. No. 6,269,422B1, entitled "System and Method for Retrieving Tape Statistical Data" incorporated herein by reference.

FIELD OF THE INVENTION

This disclosure relates to methods for displaying and analyzing statistical data retrieved from Small Computer Systems Interface magnetic tapes.

BACKGROUND OF THE INVENTION

The term "SCSI Enhanced Tape" signifies the family of SCSI half-inch cartridge tape subsystems adhering to the ANSI SCSI-2 Standard. ANSI refers to the American National Standards Institute. Each SCSI Enhanced Tape drive uses a form of half-inch cartridge media. The 36-Track subsystems use a 3890 and/or 3890 Extended tape.

The 36-Track tape subsystems were introduced in 1993 by vendors such as IBM, Fujitsu, and StorageTek, as an increased capacity replacement for 18-Track tape subsystems. These 36-Track tape subsystems provide the ability to store twice the capacity of a regular 18-Track using the same media, and up to two times the capacity using a new, extended half-inch tape cartridge, assuming that both subsystems utilize data compression.

The SCSI 36-Track tapes involved herein are Unisys tape systems designated as the OST5136, the CTS5236, and the CLU9710-36T tape subsystems. The density requirements directly correlate to the FIPS (Federal Information Processing Standard) CTS5136 subsystems, in that they can read at the 18-Track density, and then either Read or Write at the 36-Track density. The SCSI 36-Track tapes are considered to be compatible with their FIPS counterparts. They are expected to read media written by the FIPS 36-Track or 18-Track subsystems and these FIPS subsystems are considered to be able to read media written by any of the SCSI 36-Track subsystems.

Other tapes involved in the present system are the CLU9710-DLT4 and the CLU9710-DLT7 tapes which were introduced by the Quantum Corporation as a high-performance, high-capacity streaming cartridge tape product. The CLU9710-DLT4 subsystem provides a formatted capacity of up to 40.0 GB on a DLTIV tape and sustained user data transfer rates of 10.0 megabytes per second assuming compression is being utilized. The CLU9710-DLT7 can provide 70.0 GB capacity under the same circumstances.

These enhanced type SCSI subsystems are being supported via newer Unisys A-Series and NX I/O platforms, for example, those designated as RMM/IOM platforms, and are currently only connected via a Native SCSI channel.

A number of functionalities are being provided in connection with these tape subsystems of which the present focus is that involving statistical data analysis and reporting after statistical data collection is performed as has been seen in co-pending U.S. Ser. No. 09/209,985 now U.S. Pat. No. 6,269,422B1, entitled "System and Method for Retrieving Tape Statistical Data" which is incorporated herein by reference.

Statistical data gathering of a magnetic tape involves identifying various pages supported by the magnetic tape and then selecting certain data to indicate counts of such things as (i) Write errors; (ii) Read errors; (iii) Sequential-Access device pages; (iv) Track errors.

The earlier methods for gathering statistical data for a tape subsystem (such as the USR 5073) involved tagging an Unload command, and then upon completion of the Unload, issuing a single Log Sense I/O command to retrieve all the available statistical data for the drive. These internally stored statistics are "cleared" as a result of a Log Select I/O command. The problem with this method is two fold; 1) SCSI Enhanced Tape drives do not necessarily support a page code designated "Return All Supported Pages" - - - which would not allow all the statistics to be retrieved with a single I/O; and 2) the tape drive's internally stored statistical data is cleared as a direct result of an "Unload" which would result in "just-cleared" statistics being retrieved with the pre-existing algorithm. Thus, this prior algorithmic method was never sufficient to gather the required statistical data for SCSI Enhanced Tapes.

One of the SCSI Enhanced tape drives, designated the "OST5136," does support a "Return All Supported Pages" page. However, the volume amount of information it returns is prohibitive since it requires a huge buffer dimension. Here, the buffer required would be significantly larger than the standard buffer required to piece together the data returned for each page, when each page is requested individually.

The above-referenced co-pending companion case entitled "System and Method for Retrieving Tape Statistical Data", U.S. Ser. No. 09/209,985, now U.S. Pat. No. 6,269,422B1, described a method for unloading magnetic tape media from a magnetic tape drive and preserving the statistics data by allowing the statistics data to be read-out and placed in a Sumlog file.

After the completion of the retrieval of the statistical data into the Sumlog file, it is then necessary to read-out and analyze this data and place it in a format that is suitable for a field engineer to understand and to particularize any area of problem or trouble that may be occurring in the particular tape drive and its tape media. This present application now indicates how the retrieved statistical data can now be read-out and displayed and then made available for analysis by a User or field engineer in order to verify the integrity of the data in addition to pinpointing any trouble or problem areas which may be occurring. The information now provides relevant information in a specially formatted and legible manner, rather than just a dump of data which would be difficult to analyze.

SUMMARY OF THE INVENTION

This invention involves the read-out and analysis of statistical data retrieved from a magnetic tape unit. Statistical data is retrieved from the Unload operation on a magnetic tape unit after which it is deposited into a recording medium designated as a Sumlog file.

Once the statistical data has been retrieved and recorded, it is now necessary to programmatically read-out and display this data via a printer or an Operator Display Terminal and have it be presented in a particular format under which a User or field engineer will be able to garner information on various pages of the read-out data. Thus, the read-out format will indicate a particular page and indicate the Write errors in it, in addition to showing the Write errors which have been corrected by an error correction code. Additionally, another page read-out may show the Read errors which came from the magnetic tape media. Then there may be a page format which shows the track error statistics which indicate specifically, each of the individual tracks, of which there may be up to 18 tracks, and the errors which occurred on each one of the particular recording tracks involved.

The statistical data from the Sumlog file is fed to a Loganalyzer program which is then connected to a Jobformatter Library which arranges the data for display to a printer or to an Operator Display Terminal.

A keyboard is used to initiate a specialized command "LOG MAINT MT DUMPEXTRD" which invokes the Loganalyzer program, requesting this program to analyze the I/O error Sumlog entries with a special analysis. Then, the Jobformatter Library will become involved via a procedure designated "DUMP_LOGSENSE_DATA" which will parse through data from certain pages which are designated as supported pages. Then, Jobformatter will arrange to print-out or display a readable, understandable, statistical data analysis to be output to a terminal or printer.

Once the data has been formatted according to each one of the supported pages and displayed, it is then in a condition to be looked-at and analyzed by a User or field engineer in order to diagnose any type of problems which may have been occurring.

BRIEF DESCRIPTION OF THE DRAWINGS

FIGS. 3 and 4A, 4B, 4C, 4D indicate flowcharts which illustrate the steps involved in publishing the retrieved statistics;

FIG. 5 is a diagram of a printout which illustrates how the statistics may be viewed and analyzed by a user or field engineer.

FIG. 6 shows the format of a statistical data page "00";

FIG. 8 shows an example of the display of certain parameters and the associated interpretation of Page 00h and Page 02h (Write Error Counter);

FIG. 9 illustrates a sample of the page and parameter contents for Page 03h (Read Error Counter);

FIG. 10 illustrates the page and parameter contents for Page 0Ch, (Sequential Access Device Counters), Page 31h (Track Error Statistics) and Page 3Eh (for an OST5136 tape).

GLOSSARY LIST

Figure 1:
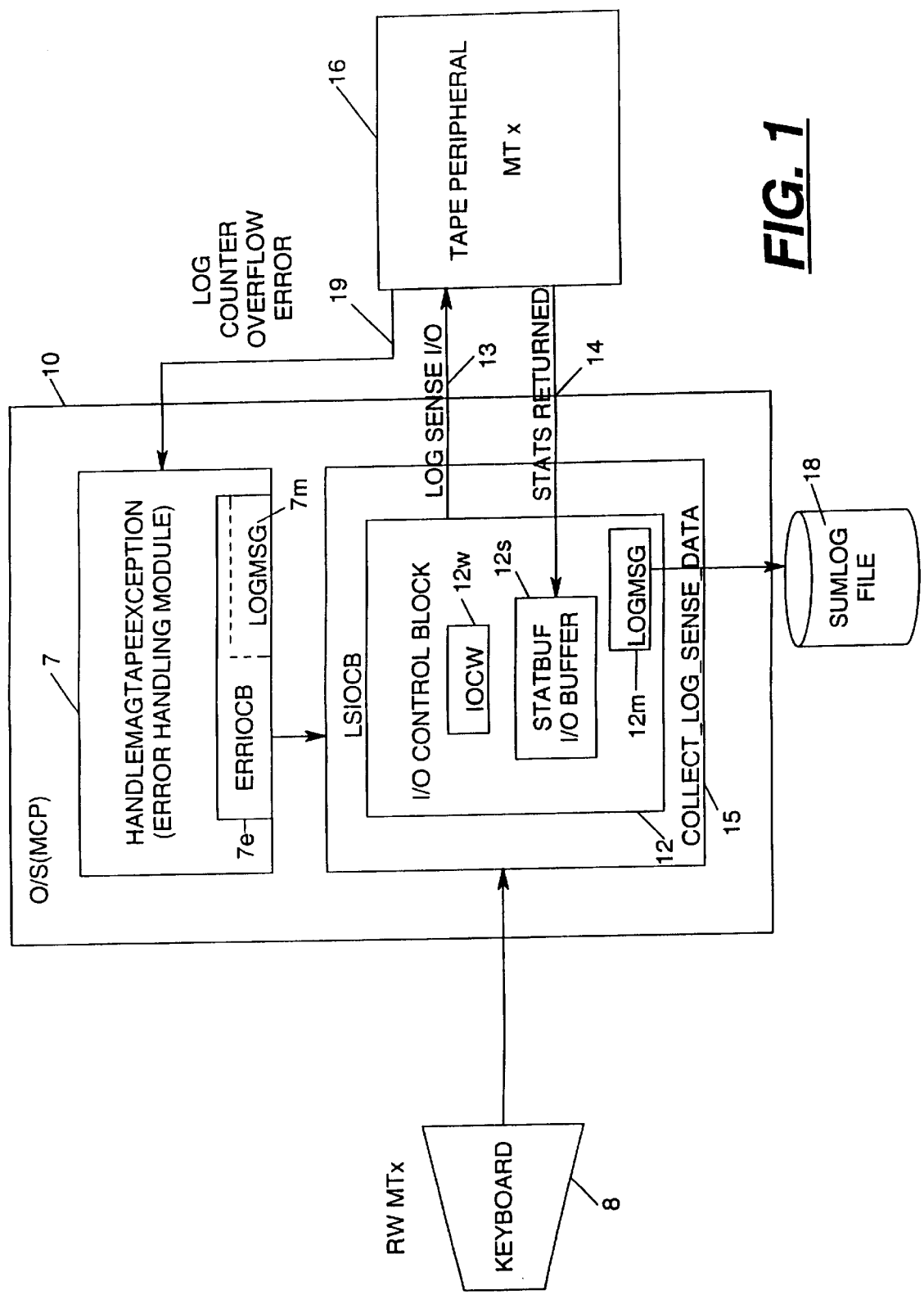
FIG. 1 is a block diagram showing the elements involved in retrieving statistics from a tape peripheral device.

1. ARRAY: This is an ordered arrangement of data elements. A vector is a one-dimensional array, a matrix is a two-dimensional array. Most programming languages have the ability to store and manipulate arrays in one or more dimensions. Multi-dimensional arrays are used extensively in scientific simulation and mathematical processing.
2. ALLOCATE_MSG: This is a Master Control Program procedure to allocate space for a message array. In the present case, this allocates space for the STATBUF array to collect the statistical information collected from the magnetic tape.
3. BUILDPRIMITIVEIOCB: This is a Master Control Program (MCP) procedure to allocate space for an Input/Output Control Block (IOCB) in a low level environment. This allocates memory for an IOCB in a low level area and sets up basic IOCB attributes.
4. COLLECT_TAPE_STATS: This is an MCP procedure called by REWINDIT prior to a tape being unloaded. The purpose of this procedure is to put a tape unit in the proper state to issue MCP I/Os and to call the next procedure designated COLLECT_LOG_SENSE_DATA.
5. COLLECT_LOG_SENSE_DATA: This is an MCP procedure called by COLLECT_TAPE_STATS for the REWINDIT procedure when a tape is to be unloaded. This MCP procedure is also called by the HANDLEMAGTAPEEXCEPTION procedure when a Log Counter Overflow exception is encountered. The purpose of this procedure is to collect and log a SCSI Enhanced Tape's statistical data as returned by its SCSI Log Sense commands. This procedure invokes an initial command to retrieve Page 00 to determine the drivers supported pages. The number of pages corresponds to the number of Log Sense I/Os to be issued to the tape drive. After all of the data is assembled, it is then written to the Sumlog file.
6. COMBINELOGAREAS: This is an MCP procedure which is called to move the LOGMSG information associated with one IOCB to another IOCB. This procedure merges the IOCB LOGMSG data structures from two different I/O operations; namely, the LOGMSG associated with the IOCB for the I/O receiving a Log Counter Overflow exception and the LOGMSG associated with the IOCB used to retrieve the tape's statistical data.
7. DOIO: This is a local procedure in COLLECT_LOG_SENSE_DATA that sets up IOCB attributes and initiates an I/O request to a specified unit. This procedure will set up IOCB attributes and initiate the I/O request specified by the Input/Output Control Word (IOCW) that is passed in. A buffer STATBUF, is attached to the IOCB with an array index indicating the area following the last page's data, so that the next page's data returned will be appended to the end of the array.
8. DUMP_LOGSENSE_DATA: This is a procedure in the SYSTEM/JOBFORMATTER library used for statistical data analysis. This procedure analyzes and displays a tape's statistical data stored in the Sumlog for Enhanced SCSI tapes. This provides the valuable end result to the User.
9. DUMPEXTRD: This is a SYSTEM/LOGANALYZER command option which indicates that extended result descriptor information should be dumped for any applicable Sumlog entries. This is provided as input to the SYSTEM/LOGANALYZER program from the Operator Display Terminal (ODT).
10. EBCDIC: This is the Extended Binary Coded Decimal Interchange Code, which is a form of display that represents numbers as alpha-numeric, that is to say, a mixture of numbers and special characters.
11. HANDLEKAGTAPEEXCEPTION: This is an MCP error handling procedure for tapes. It handles errors involved for a tape drive and stores information about those errors in the Sumlog. The acronym HMTE is used to designate this.
12. IOCB: This represents the Input/Output Control Block (IOCB) which is an MCP data structure used to communicate between the software and the hardware for I/O requests. An action to "Set IOCB Fields" is performed to set up attributes in an IOCB in order to issue Log Sense/Select commands to a SCSI Enhanced Tape.
13. IOCW: This represents an Input/Output Control Word (IOCW) which is a word variable that contains the logical information about an Input/Output request and which is included in an IOCB. An action to "Set IOCW" is used to set-up the IOCW variable in order to indicate that a Log Sense I/O, requesting a specific page, is to be issued.

14. Jobformatter Library: (also known as SYSTEM/JOBFORMATTER) This is a library called by the SYSTEM/LOGANALYZER program to analyze and to report a Sumlog entry. The Loganalyzer program will pass a Sumlog file entry to the Jobformatter Library for analysis and/or for reporting. The report can be generated on the Operator Display Terminal (ODT), or to the printer.

15. SYSTEM/LOGANALYZER Program: This program controls the analysis of a Sumlog file. The Loganalyzer program parses the Sumlog file and determines whether the User's specifications require an entry to be analyzed or displayed. If analysis or reporting is required, the entry is then passed on to the Jobformatter Library, where the analysis and the reporting is actually done.

16. LOGMSG: This is an MCP data structure containing log information about an entry for the Sumlog.

17. LOG COUNTER OVERFLOW: This is a warning/error condition returned by an I/O operation to indicate that a tape unit's internal statistical data counters are ready to overflow and should be retrieved. This condition causes entry into the procedure COLLECT_LOG_SENSE_DATA. Special considerations for logging the information in the Sumlog must be made to include this error/warning notification.

18. LOGIO: This is an MCP procedure that takes information from a LOGMSG data structure and then writes it to the Sumlog. This procedure formats the information in the LOGMSG structure, then writes the I/O entry to the Sumlog.

19. LOG MAINT MT DUMPEXTRD: This is an Operator Display Terminal (ODT) Input to initiate the Loganalyzer program requesting analysis of I/O Sumlog entries. It will result in extended result data being dumped.

20. LOG SENSE PAGE: This denotes the specific data returned from a magnetic tape drive in response to a Log Sense command requesting that Page's data. Each SCSI Enhanced tape type supports a set of Log Sense Pages (statistical data page) that correspond to a specific set of information (for example, Page 02 returns Write Error information or Page 03 returns Read Error information).

21. Log Select: This is a SCSI command issued after a set of Log Sense I/O's to clear out the tape drivers statistics. This acts to clear out the tape drivers internal counters of the accumulated Read errors, Write errors, and other stored statistics.

22. LOG FILE: aka SYSTEM/SUMLOG file or Sumlog file.

23. LRDLOGCOUNTEROVERFLOWID: This is an error-type indicator value generated by the MCP, after interpreting the unit's result descriptor (RD) that indicates one or more of the tape drivers internal statistical data counters are ready to overflow. This is an error identifier indicating the need to retrieve a magnetic tape's statistical information before it overflows.

24. Log Sense I/O: This is a SCSI I/O command issued to a magnetic tape unit to gather statistical information that has been stored internally by the unit.

25. LRD or Logical Result Descriptor: This MCP variable is the logical representation of a physical error result returned by a unit.

26. LSIOCB: This is the local IOCB data structure that is used to issue all of the Log Sense/Select I/O's to the tape device in the MCP procedure COLLECT_LOG_SENSE_DATA.

27. MCP: This designates the Master Control Program Operating System (OS) for Unisys Corporation platforms. The MCP functions in complete integration with hardware logic to simplify system operation and control. It provides automatic multiprogramming and multiprocessing, as well as centralized I/O control for peripheral and data communication devices. It automatically allocates system resources, including data and I/O processors, memory and peripherals. It manages all job and task initiation and control, local and remote operator interface and system security. The MCP automatically handles all disk file management, including space allocation, file assignment and access control. It features a form of memory management known as actual segment descriptor (ASD). ASD memory management expands the capacity, performance, and memory addressability of current enterprise server systems with the potential to address up to 24 GB (24 billion bytes) of memory.

28. MESSER: This is an MCP procedure that displays text information to the Operator Display Terminal (ODT).

29. NUMPAGES: This is an integer variable indicating the number of pages supported by the tape unit. NUMPAGES is initially derived from the length of the list of supported pages (each entry being one byte in length) returned by a Page 00 Log Sense I/O minus one (since Page 00 is in the list and has already been accounted for).

30. MAINTLOGIOEXCEPTION: This is a procedure in the Jobformatter Library used to handle the analysis of Sumlog entries.

31. MAINTENANCE RECORD: An I/O error entry in the Sumlog file in a format recognized by the MAINTLOGIOEXCEPTION procedure.

32. PUTYPE: This is the Physical Unit Type of a magnetic tape device. It is used to differentiate between the different types of SCSI Enhanced tape drives.

33. PAGE_LENGTH: This is an integer variable used in COLLECT_LOG_SENSE_DATA. This involves an action to "Set PAGE_LENGTH to the Size of the Page just retrieved". This will assign a value to the integer of PAGE_LENGTH indicating the actual size of the page just retrieved by a Log Sense I/O command.

34. PAGE_CODE: This is an integer variable used to indicate which particular page of the SCSI Log Sense command is being requested.

35. PAGE_TITLE: The PAGE_TITLE is a text string describing the contents of the Log Sense Page being displayed by Jobformatter. For example, Page 00 will display "Supported Pages" as its Page Title.

36. Page Control: Page Control is a field in the Log Sense/Select I/O Control Block.

37. REWIND/UNLOAD TAPE: This is a function of a tape drive that involves the action of moving a tape to its logical beginning prior to ejecting the tape media from the drive.

38. REWINDIT: This is an MCP procedure called when a tape rewind is requested. This handles the process of rewinding and unloading the tape.

39. RDSTATDATAX: This an integer value that designates the offset of the beginning of the "statistical data" portion of the Sumlog entry. This is also a parameter used in the procedure designated DUMP_LOGSENSE_DATA.

40. RW MTX: This is a command to rewind and unload (or eject) a tape drive designated "x".

41. RESULT DESCRIPTOR: This is a reference to a word in the IOCB that pertains to the completion status of an I/O request. This result is returned in a format that allows the MCP to determine what error (if any) occurred as a result of issuing an I/O.

42. SYSTEM/LOGANALYZER: This is a program to analyze a Sumlog. This program is designed to produce a report consisting of all of the Sumlog entries that correspond to the input parameters which were set up by the User. The entries are extracted from the Sumlog and then formatted for display to either the printer or the Operator Display Terminal (ODT).

43. SUMLOG File: This is a file containing records of jobs previously run of the MCP activity, of I/O errors and other information regarding the past operational status of the machine environment. This file is written by the MCP to keep track of previous items of machine status. A special focus concerned herein is with the maintenance I/O entries which record a magnetic tape's statistical information.

44. SCSI: This represents the Small Computer System Interface which is an industry-standard Input/Output protocol used by peripherals for communication purposes.

45. STATISTIC INFORMATION: This refers to the statistical information retrieved from a SCSI Enhanced tape drive by issuing various Log Sense commands to the unit. The statistical information involves Read errors, Write errors, and such information to determine if the magnetic tape or the tape drive is functioning properly.

46. STATBUF: This is the Statistics Buffer which is an array for holding information retrieved from a magnetic tape to indicate certain desired statistical information.

47. SBPTR: This is the Statistics Buffer Pointer (STATBUF) which can indicate the position of certain data residing in a buffer array. An action to "initialize pointer SBPTR to STATBUF[0]" initializes the pointer SBPTR to the beginning of the array STATBUF. This array will hold the statistical data returned from the Log Sense I/O's given to the SCSI Enhanced magnetic tape.

48. STATDATABYTES: This is an integer variable used in the Input/Output Control Block (IOCB) to indicate the maximum amount of data to the transferred from the magnetic tape unit.

49. SCSI Enhanced Tape: This involves certain magnetic tape subsystems which are supported by software of the Unisys Corporation. These tape subsystems include - - - CTS5236; OST5136; CLU9710-36T; CLU9710-DLT4; CLU9710-DLT7. These are systems manufactured by StorageTek Corporation, Fujitsu and Quantum. "SCSI Enhanced Tape" refers to the family of SCSI half-inch cartridge tape subsystems supported by Unisys Corporation and adhering to the ANSI SCSI-2 standard. Each SCSI Enhanced tape drive uses a form of half-inch cartridge media. The 36-track subsystems use a 3890 or 3890 extended tape. The DLT subsystems use DLT tape cartridges.

50. Stat Report: This represents the statistics report that describes the statistical data returned by the SCSI Enhanced tape drive. The report is generated to the Operator Display Terminal (ODT) or to the printer by the Jobformatter Library 22, which analyzes a Sumlog file entry describing the statistics returned by the tape drive.

51. UNIT Table: An MCP table which contains an entry for every unit on the system. For tape units, it identifies the particular tape type and density among other specific tape drive information.

52. UNITATTRIBUTES Table: An MCP table which contains attribute information for each unit on the system.

For tape drives in particular, it contains information regarding whether the tape clears its internal statistics as a result of an Unload command being issued or not.

GENERAL OVERVIEW:

As was described in the companion co-pending application, a system and method was provided for the retrieval of highly valuable informational and statistical data from a tape peripheral unit. Referring to FIG. 1, there will be seen a magnetic tape peripheral unit 16 which is connected to an operating system 10 designated as MCP (or Master Control Program).

Within the Master Control Program, there resides a combination software and hardware unit 15 designated "COLLECT_LOG_SENSE_DATA" which represents a functional unit or functional structure which involves a Log Sense Input/Output Control Block (LSIOCB 12), which has an Input/Output Control Word (IOCW, 12w) and an I/O buffer 12s (STATBUF 12s), in addition to a Log Message Data Structure (LOGMSG 12m).

The Log Sense Input/Output Control Block 12 is seen to have an Output connection 13 designated Log Sense I/O over to the tape peripheral unit 16. Similarly, the tape peripheral unit 16 has a return connection 14 for returning the statistics to the Input/Output buffer 12s (STATBUF). The statistical data is collected into a data structure designated Log Message 12m (LOGMSG) and is then transferred to the Sumlog file 18 which is a recording medium for storing the statistical data.

Additionally, as seen in FIG. 1, the Operating System 10 also has an error handling module 7 which receives Log Counter Overflow error signals on connection 19 from the tape peripheral 16. The error handling module 7 is seen to have an error Input/Output Control Block 7e (ERRIOCB) and also within that structure, is a Log Message data structure 7m (LOGMSG). The structure 7e then communicates to the functional structure 15 for COLLECT_LOG_SENSE_DATA.

The functional structure 15 also receives input from a keyboard unit 8 which is operated by a user and which may institute a Rewind command to a particular tape peripheral. RW MTx indicates a request to Rewind and unload a tape peripheral designated MTx.

Figure 2:
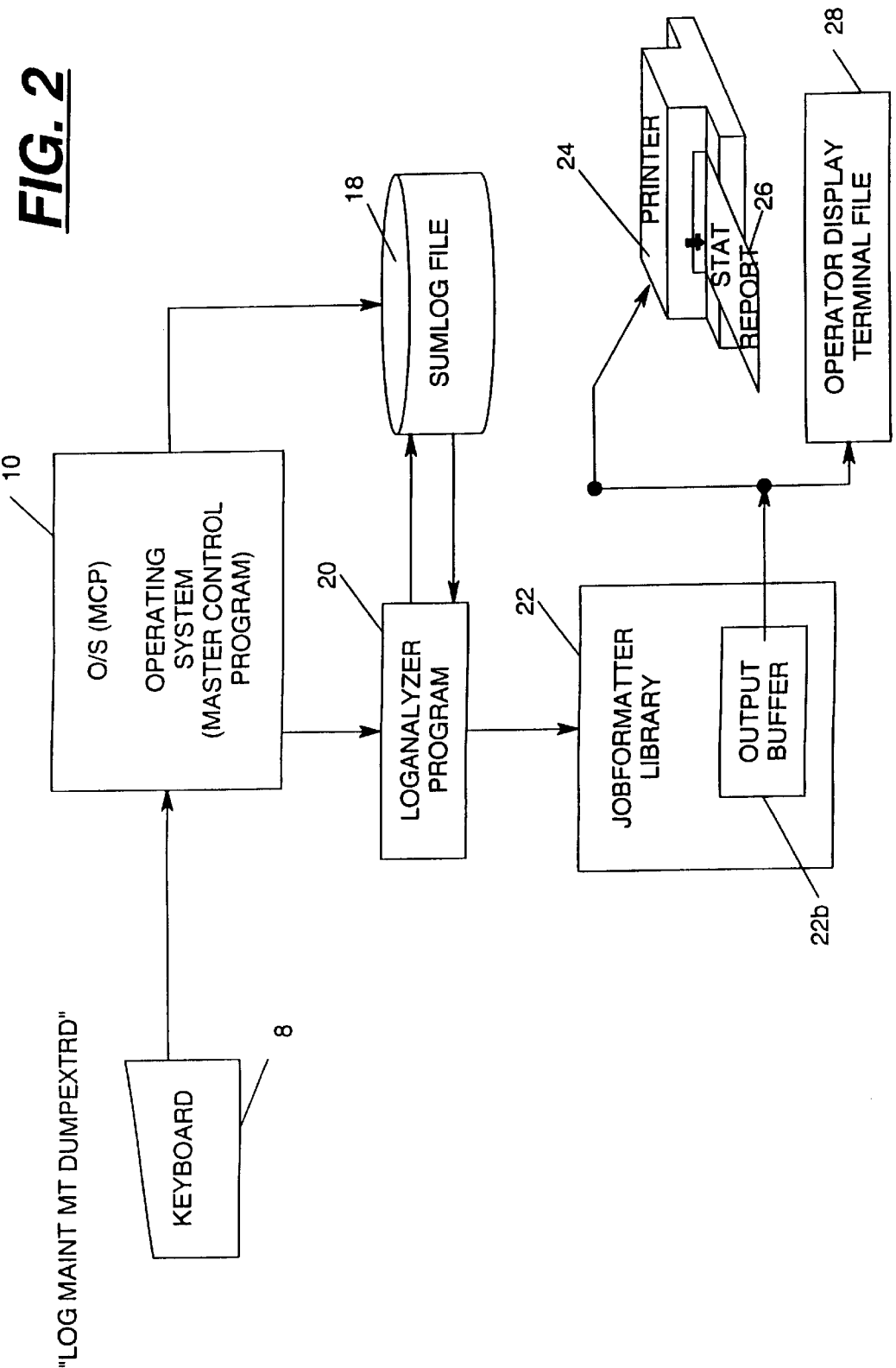
FIG. 2 is block diagram showing the elements involved in taking retrieved data from an output file and publishing a statistics report for analysis.

Once the retrieved tape statistics have been placed in the Sumlog file 18, then the next function which is the focus of the present application, is indicated in FIG. 2 wherein the retrieved statistical data in the Sumlog file must now be processed through a Loganalyzer program 20, and a Jobformatter Library 22, after which it can then be output via output buffer 22b to a printer 24 or an Operator Display Terminal 28.

The basic overall operation functions as follows:

After retrieving and storing statistical data from a tape drive, the task of making the data available to users for subsequent analysis is required. The co-pending patent application (U.S. Ser. No. 09/209,985) titled "System and Method for Retrieving Tape Statistical Data" described how the SCSI Enhanced tape's statistical data was collected and subsequently stored into a Sumlog file for this purpose. The instant invention will describe the method for reading out the data from the Sumlog file and reporting it to the User via an ODT (Operator Display Terminal) terminal display or a printed report. The SYSTEM/LOGANALYZER 20 program's purpose is to select specific records from a Sumlog file and pass them for analysis and display to the SYSTEM/JOBFORMATTER library 22.

For previous tape types (i.e., the USR5073), this reporting was done on a detailed level, specific to only one tape type. The information provided was static in that a table's worth of data was displayed and any new or changed information from the vendor was not available unless changes were made to the code to specifically call them out. Also, with the addition of a number of newly supported SCSI Enhanced Tape types, each tape type's statistics would require a specialized table to call out its individual information. This would have resulted in a multitude of tables being displayed with cryptic column titles that would only confuse and complicate the task of deciphering the reliability of the tape drive and/or its media.

A new method for reporting statistical data was deemed necessary to provide flexibility, completeness and to encompass the same format for all the SCSI Enhanced tape types. This method will rely on the SCSI-2 ANSI Standard format for a Log Page (i.e., the returned data of a Log Sense I/O command). By conforming to this standard, the data can be parsed and displayed in a coherent manner for all SCSI tape types. Specific information can be quickly and confidently determined by knowledgeable tape users based on the tape's product specification. Each user has the ability to call out whichever information is relevant to his particular and evolving needs.

This Log Page format seen in Table 0 (and FIG. 7) has the following format (with the exception of Page Code 00 whose Page Data is X number of bytes, each byte containing a Page Code supported by the tape as seen in FIG. 9):

TABLE 0

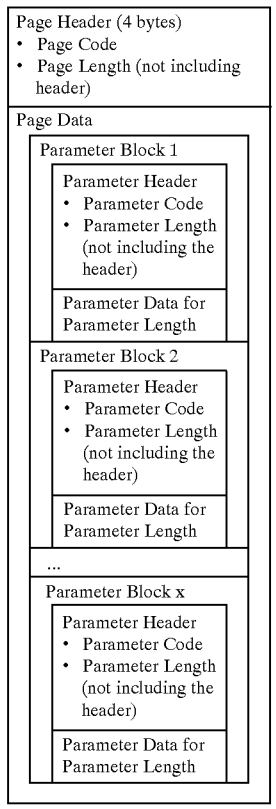

The Loganalyzer program (20, FIG. 2) is run with specifications as to what type of information to report, where to generate the report and, optionally, a specification as to which output format to display it in. With this user-supplied information, the Loganalyzer program reads each record entry of the Sumlog and passes any records relevant to the user's request to the SYSTEM/JOBFORMATTER library 22. For the task of extracting SCSI Enhanced tape's statistical data from a Sumlog file, the Loganalyzer program input would indicate an output venue, either "P" for printer, "CON" for console or "REM" for the Remote terminal which is the default venue. Following the output venue, the Loganalyzer 20 needs to know what information is to be analyzed. Again for the task of extracting the statistical data, the option "MAINT MT" will produce this analysis. And lastly, Loganalyzer 20 requires an output format, in this instance, "DUMPEXTRD" to indicate a tape's extended result data should be "dumped" in semi-raw form.

When the Jobformatter Library gets passed a Sumlog record containing statistical information, it first finds the Page Code 00 information that contains a list of the supported log Pages. This information is reported to the output media (printer or terminal) as seen in FIG. 5:

Page 00 [<Page header>]: Supported Pages→00 02 03 0C 31 3E

From this information, all other Pages are searched for and displayed in the order they appear in the Page 00 data list. All of the subsequent Pages have format described in Table 0 above. Each of these pages is displayed as such:

Page xx [<Page header>]: Page Title <Parameter header > < Parameter data>, <Parameter header><Parameter data>, . . .

Note: All data enclosed in <>above is displayed in hexadecimal form.

Each Parameter contains specific information usually in counters of individual error types. For example, Page 02 (FIG. 5) titled "Write Errors" may hold Parameter 0001 that returns a count of the number of write data checks detected by the firmware, and so on.

When a vendor updates firmware to include another Parameter or Page, the new Page Code is also included in the Page 00 data so that Jobformatter 22 can search for it in the retrieved data. Or the new Parameter will be displayed in the same fashion as the pre-existing parameters. So this method provides a flexible, complete, and coherent method for displaying a SCSI Enhanced tape drive's statistical data.

DESCRIPTION OF THE PREFERRED EMBODIMENT

The presently described system for the recording, and display, and analysis of the retrieved tape statistics is shown in FIG. 2. Here, an Operating System 10 (Master Control Program) receives input from a keyboard user 8 and provides an Output to the Sumlog file 18, whereby a Loganalyzer program 20 can read from the Sumlog file 18 in order to format pages of analysis which parses the Sumlog file and determines whether the User's specification requires a particular entry to be analyzed or displayed. Thus, if analysis or reporting is required, the entry is then passed onto the unit designated as the Jobformatter Library 22 where the analysis and reporting is actually effectuated.

The Jobformatter Library 22 is called by the Loganalyzer program 20 to analyze and report on the entries in the Sumlog file 18, after which the Jobformatter Library will generate a report which will be presented to either the Operator Display Terminal 28, or to the printer 24, which can display a statistics report 26, as seen in FIG. 2.

In FIG. 2, the keyboard 8 is seen to have a command designated "LOG MAINT MT DUMPEXTRD" which is a call made to invoke the Loganalyzer program 20 with certain required Output specifications. This constitutes an operator Input command requesting the Loganalyzer program to analyze the Maintenance I/O error Sumlog entries with a special analysis, and to include any associated extended result data. Thus, the Loganalyzer 20 will receive and report on the statistical data from the Sumlog file that has been generated from the tape peripheral 16 (FIG. 1).

The read-out of data from the tape peripheral involves the use of pages which are designated as "supported pages." Here, there is used a function called the PAGE_CODE which is an integer variable used to indicate which particular page of the SCSI Log Sense Command is being requested. This further leads to a "PAGE_TITLE" which is a text string describing the contents of the Log Sense page being displayed by the Jobformatter 22. For example, Page 00 will display "Supported Pages" as its page title.

It should be understood that every single tape peripheral has a particular specification coming from the vendor that indicates the type of tape media that is involved and the type of commands that it will follow. One of the items that is performed is that of Log Sense Data.

FIGS. 3 and 4A, 4B, 4C, 4D are a set of flow charts which illustrate the various steps of sequential operation that the software algorithm (involved with reading-out and providing an analysis format for the statistical data) will be involved with. The type of format which is reported and displayed is shown in FIG. 5.

Figure 3:
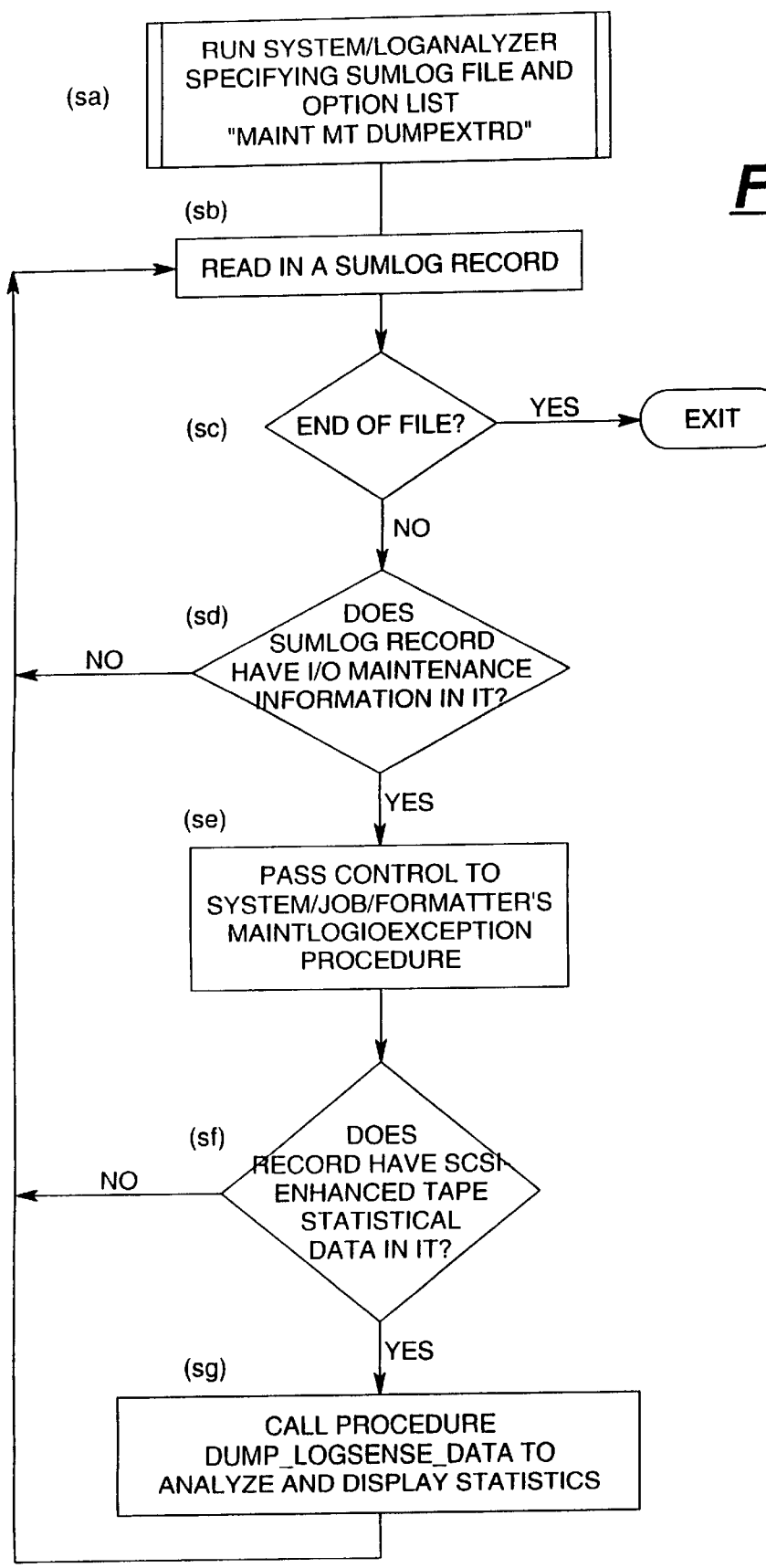

Referring to FIG. 3, there is seen a programmatic sequence for displaying Log Sense data.

Referring to FIG. 3, at step sa, the Loganalyzer Program 20 (of FIG. 2) is run in order to access the specified Sumlog file 18 with the statistical data in it. An option list, "MAINT MT DUMPEXTRD", is supplied to indicate the desire to have all tape statistical data displayed. This Operator Display Terminal (ODT) input to the Loganalyzer program is requesting an analysis of the Maintenance I/O Sumlog entries (MAINT) for magnetic tapes (MT). Further, any associated extended result data is dumped (DUMPEXTRD). This extended result data may include statistical data if it is available.

At step sb, the Loganalyzer program 20 reads in a record from the Sumlog file 18.

At step sc, a decision is made as to whether the end of the Sumlog file has been reached. If it has, "YES", the algorithm is complete. If it hasn't, "NO", then the flow continues to step sd.

At step sd, another decision is required to determine whether the record is the desired Maintenance I/O record that could contain tape information in it. If the answer is "YES", then the flow continues to step se. Otherwise, "NO", is the answer indicating further analysis of the record is not necessary as it does not have any information pertinent to the input request given in step sa and the flow loops back to step Sb so that another record is read.

At step se, the procedure MAINTLOGIOEXCEPTION in the SYSTEM/JOBFORMATTER 22 is instituted to analyze the Maintenance I/O Sumlog records. The Maintenance I/O record contains formatted I/O information previously contained in the LOGMSG data structure as seen in 12m of FIG. 1.

At step sf, a decision block is encountered as to whether this particular Maintenance I/O record contain an SCSI Enhanced tape's statistical data in it. Since other MCP procedures also use this format to log information about I/O errors, statistical data is not necessarily involved with the record. If there is statistical data available in the record ("YES"), then flow proceeds to step sg, otherwise ("NO"), causes flow to return to step sb.

At step sg, the procedure DUMP_LOGSENSE_DATA is involved to parse through the statistical data and display it appropriately to the output medium specified (printer or terminal).

Figure 4A:
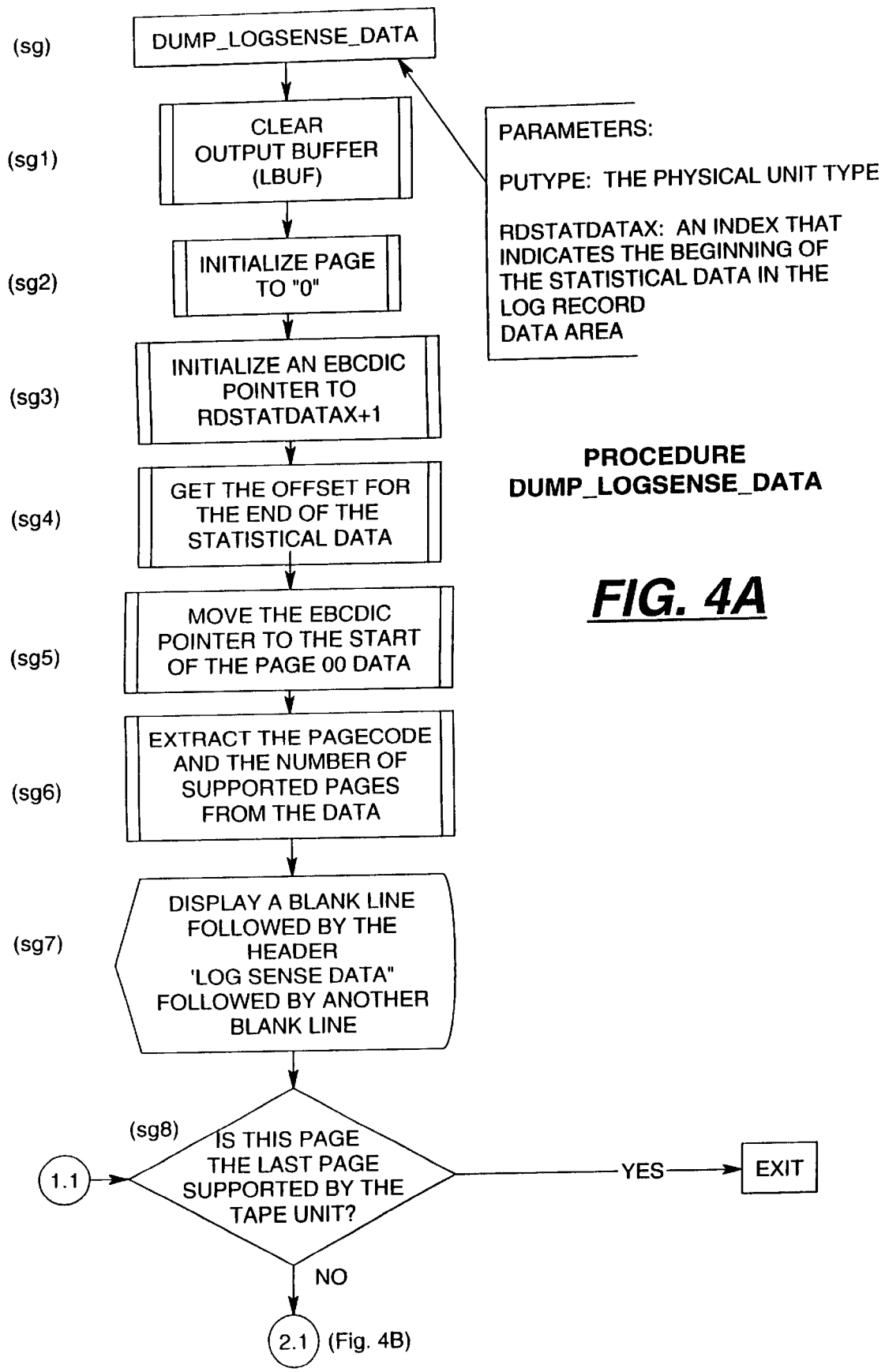

Referring to FIG. 4A, there is indicated a flow chart showing the steps involved in the procedure DUMP_LOGSENSE_DATA (originally seen at step sg of FIG. 3).

In FIG. 4A, the step sg indicates the beginning of the DUMP_LOGSENSE_DATA sequence. This involves certain parameters which include the Physical Unit Type (PUTYPE) and the index into the Maintenance I/O Log record pointing to the statistical data area (RDSTATDATAX).

The RDSTATDATAX is an integer value that designates the beginning of the statistical data area and is one of the parameters to the DUMP_LOGSENSE_DATA procedure of FIG. 4A.

At step sg1, the program will "clear out" the Output buffer 22b (FIG. 2).

At step sg2, the program will set the integer page to zero. This value will be incremented later on until the number of pages supported by the tape have been considered.

At step sg3, the program will initialize an EBCDIC pointer to the Maintenance I/O Log record at offset RDSTATDATAX+1 which indicates the statistical data involved.

At step sg4, an "offset" is calculated for the end of the statistical data based on the size of the statistical data area located in the maintenance log record.

At step sg5, the pointer is moved to the start of the Page 00 data.

At step sg6, then the Jobformatter 22 will extract the page code value (i.e., 00) and the number of pages involved from the page 00 header block. The page code identifies which log page of the Log Sense SCSI command is being analyzed.

At step sg7, the printer 24 or ODT 28 will display a blank line followed by the text string "Log Sense Data" followed by another blank line.

At step sg8, a decision block is reached to question whether the PAGE is the last page supported by the tape unit. If the answer is "No", then the next step proceeds to reference mark 2.1 in FIG. 4B. If the answer is "YES", the procedure is exited.

Figure 4B:
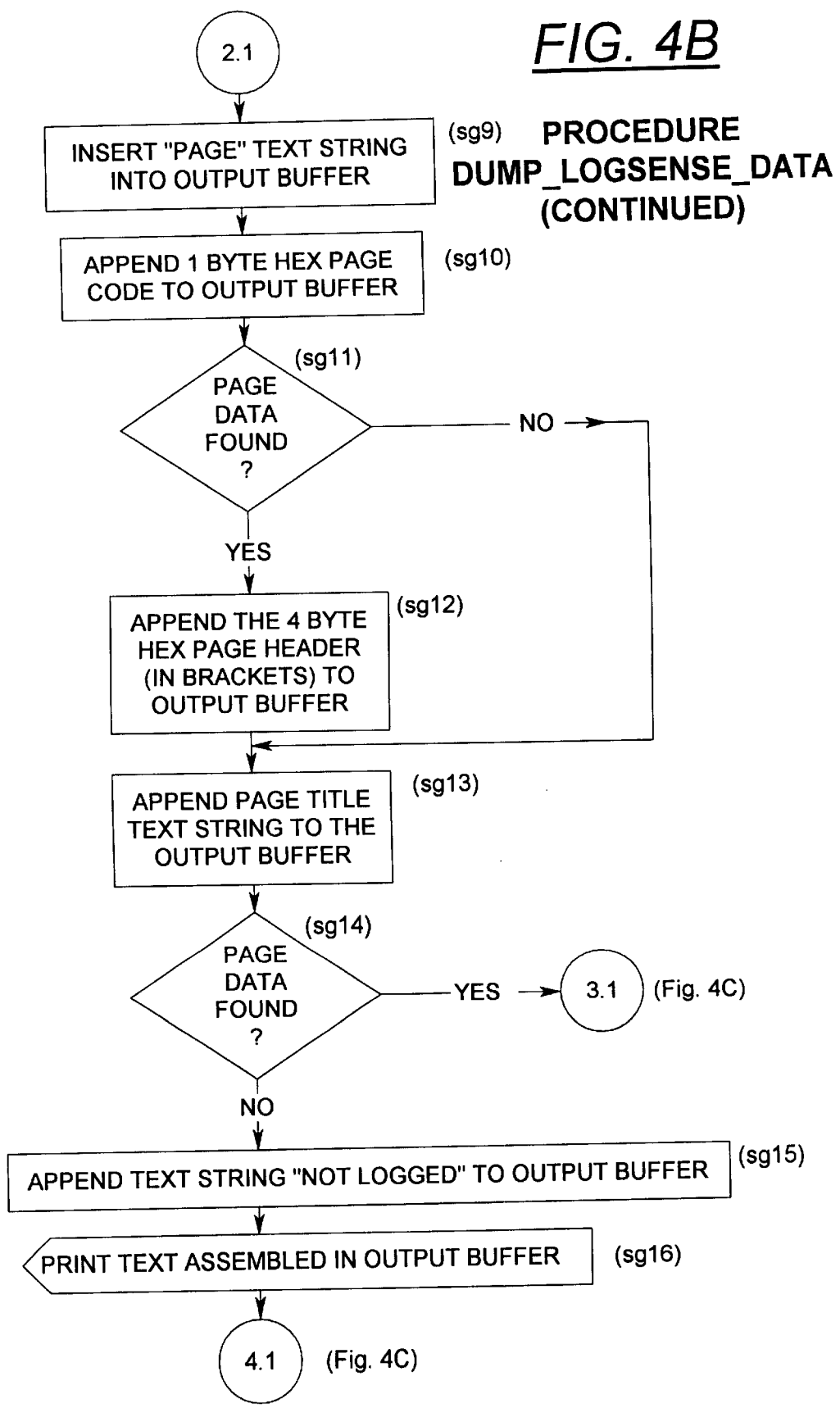

Now referring to FIG. 4B, there is a continuation of the procedure designated DUMP_LOGSENSE_DATA which starts at the reference mark 2.1.

At step sg9, the text string "Page" is inserted into the output buffer.

At step sg10, the one byte hexadecimal page code is appended into the output buffer 22b (FIG. 2).

At step sg11, a decision block determines whether or not the page's data was found. If the answer is (YES), then at step sg12, the 4 byte hex page header enclosed in square brackets [ ], is appended to the output buffer 22b.

At step sg13, the page title text string is appended to the output buffer. This title is based on the page code and the Physical Unit Type (PUTYPE) of the tape. The page title is a description of the contents of the Page being displayed (i.e., "Write Errors" or "Read Errors").

At step sg14, there is another decision block to determine whether the page's data was found or was not found. If the data was not found (NO), then step sg15 will adjust the pointers and append the text string "NOT LOGGED" to the Output buffer.

At step sg16, the text accumulated in the output buffer is displayed to the ODT or printer after which (as seen at the reference marker 4.1), the continuation will occur at step sg16, FIG. 4C.

At step sg17 (FIG. 4C), the PAGE will be incremented, the next page code is extracted from the supported pages list, and there will be a movement of the EBCDIC pointer to the beginning of this next page.

Returning back to step sg14, FIG. 4B if the page was found (YES), then the procedure moves to reference mark 3.1 of FIG. 4C.

Now referring to FIG. 4C, it is seen that reference mark 3.1 represents the step sg14-YES. It then proceeds to step sg14*a*.

At step sg14*a*, another decision block is reached to determine if the Page Code is page 00 as this is the only page that has a unique layout. For this page, there are no parameter blocks, just a list of page codes supported.

If the PAGE does represent Page Code 00 (YES), then go to step sg14*b*, otherwise (NO) continues at sg14*ap*.

At step sg14*b*, the list of pages supported by the tape peripheral, is displayed to the ODT or the printer.

This then proceeds to step sg17 whereby the EBCDIC pointer is incremented, the next Page Code is procured and there is a movement of the pointer to the beginning of the next page.

At step sg14*a*, if the Page Code which has been previously described is not Page 00 (NO), then step sg14*ap* determines to use the default page format to print the hexadecimal page data-which then returns to step sg16.

Figure 4D:
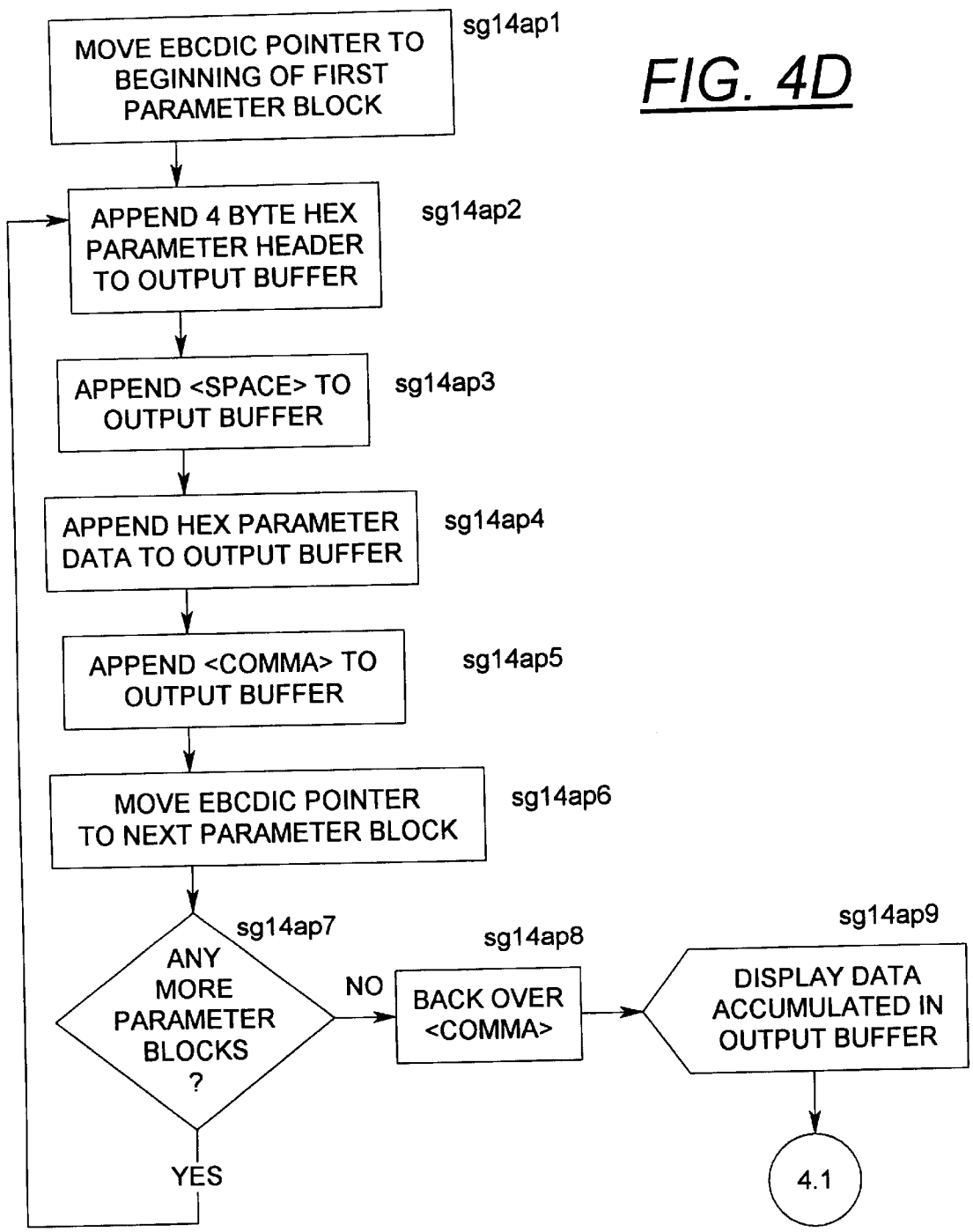

Step sg14*ap* is shown in expanded form in FIG. 4D.

At step sg14*a*, if the Page Code is not Page 00 (NO), then step sg14*ap* begins a loop through the Page data to display all of the Page's Parameter Blocks.

In FIG. 4D at step sg14*ap*1, this expands the flow of step sg14*ap* where the EBCDIC pointer is moved to point to the beginning of the Page's first Parameter block.

At steps sg14*ap*2 and sg14*ap*3, these involve appending the 4 byte hexadecimal Parameter header to the output buffer followed by a space in output buffer 22*b* (FIG. 2).

At steps sg14*ap*4 and sg14*ap*5, the Parameter data is appended to the output buffer in hexadecimal form followed by a comma.

At step sg14*ap*6, the EBCDIC pointer is moved to the beginning of the next Parameter block contained in the Page's data block.

At step sg14*ap*7, there involves a decision as to whether there are any more Parameter blocks. If there are not (NO), then flow proceeds to sg14*ap*8, otherwise, flow loops back up to step sg14*ap*2 to append further Parameter header/data combinations.

At step sg14*ap*8, it has been determined that there are no more parameter blocks within the Page data and the comma appended by step sg14*ap*5 is backed out of the output buffer.

At step sg14*ap*9, the data accumulated in the output buffer 22*b* is displayed to either the printer or the ODT terminal and the flow, to display a default page data format, then Exits to reference mark 4.1

FIG. 5 will be seen as a drawing of a formatted print-out of information which is used to enable a field engineer or user to analyze certain situations about the statistical data retrieved from a particular tape media.

Referring to FIG. 5, there is seen at location Al, the heading "Log Sense Data." Under this, is an indication of Page 00 followed by the 4 byte page header block of [00000006], which indicates that Page 00 contains 6 bytes of data which denote 6 pages are supported on the tape. Then, at location P1, the 6 supported pages are designated as Page 00, Page 02, Page 03, Page 0C, Page 31, and Page 3E.

Then at position A2, there is indicated the Page 02 followed by its 4 byte page header in brackets which is followed by the Page title "Write Errors." Then at position S3, there is seen the notation "00006008" which indicates the parameter header for Parameter Code 0000 which is 8 bytes long. The data associated with this parameter follows at position S4 and is seen as 0000000000000001. For an OST5136 tape drive, Parameter Code 0000 refers to write errors recovered by the Error Correction Code (ECC) and this example shows that 1 instance of this type has occurred.

Continuing at position S5 in FIG. 5, this example shows that the tape drive received a total of 3 write blocks corrected by internal error recovery actions (Parameter heading "00036008" indicates Parameter Code 3 which refers to this type of error action and Parameter Data "0000000000000003" indicates the number of occurrences).

Also of interest at position S6, this example shows in hexadecimal notation that the Total number of bytes written to the tape media (Parameter Code 0005) was 0000000102C562 bytes which results in a decimal figure of 16,958,818 bytes.

At position A3, the same type of information is seen for Read Errors.

Then likewise, Page 0C at mark A4 provides information designated as "Sequential Access Device Page." Sequential access to device is a tape drive operation. This is common terminology for sequential access since data is being accessed sequentially, instead of randomly. Sequential access device page tells how much activity the tape drive performed in actions to/from the tape and to/from the initiator.

Further at position A5 in FIG. 5, Page 31 is recognized as the Track Error Statistics page. This shows the number of ECC correctable Read or write errors detected on a track of the tape. It should be noted that the OST5136 is a 36-track tape; with 18 tracks read in one direction, and then the other 18 tracks are read in the other direction for a combined total of 36 tracks.

The last Page supported by this tape drive (Page 3E) is at mark A6, which is indicated as not being logged in the Sumlog file. Some pages are not useful or are redundant and the decision is made when collecting the statistical data that a particular page has no value. That is the case with the Page 3E here.

As a result of the formatted analysis information, it is possible to garner some analysis of what type of problems one might have with the tape drive unit. For example, if the tape drive has been causing some sort of trouble, or a customer has been complaining about the tape drive, the answer would not be good enough to say that something is wrong and then spend $5,000 to $10,000 to replace the tape drive with a new one.

The answer is to put in a job operation that runs on the particular tape drive, have the data go back and forth, and then notice that something is wrong. In this case then, the field engineer might initiate a RW to the suspect tape drive. This then causes the collection of statistical data to be analyzed. For example, it might show that instead of three recovered errors, the drive was shown to have 1.5 million recovered errors. This indicates right away that the magnetic tape drive is working much too hard in order to try to recover data. Likewise, if there was a byte count which indicated how much data actually had been transferred, and this figure was a very low figure, this would indicate that the system is working awfully hard for very little amounts of data transfer. So then as a result, the useful and practical factor is to make an actual analysis based on the information in order to find out exactly where and how the tape drive is overworking itself, or where multitudinous errors are occurring, or where very little data is being transferred.

Once this analysis has been made, it may be found that it is not the tape media drive at all, but it is the tape media which has some worn spots or improper codings, or some other problem that needs to be corrected by actually replacing the tape media. Thus, by finding out how the tape was reacting, and one noticed that the tape drive was constantly trying to get to the tape media, but the tape media was not responding correctly, then the Field Engineer or User would know that he does not have to spend $10,000 to get a new tape drive, but he may just need to replace the tape media.

Table I shown here below is a table indicating the various page codes 00h, which indicates the supported log pages, while page code 02h shows the error counter page on Write operations; then page code 03h shows the error counter page for Read operations. Then, page code 0Ch, is the sequential-access device page, while page code 31h shows the track error statistics, and page code 3Eh indicates a request for all supported pages.

TABLE I

PAGE CODES

| PAGE CODE | DESCRIPTION |
| --- | --- |
| 00h | Supported Log Pages |
| 02h | Error Counter Page (Write) |
| 03h | Error Counter Page (Read) |
| 0Ch | Sequential-access device page |
| 31h | Track Error Statistics |
| 3Eh | Return All Supported Pages |

The Log Sense command returns data in a page format. Each Log page begins with a 4-byte page header followed by "0" or more variable length Log parameters defined for that page.

As illustrated herein according to the abbreviated examples shown in the FIGS. 6–10, it can now be seen that a format has been provided for analysis of the operation of the tape media and the tape drive, and from this analysis there can be effectuated a diagnosis of the type of problems or errors which are occurring and which then can be corrected in the most expeditious fashion.

FIG. 6 shows the statistical data format for Page 00. It will be seen that the page header has 4 bytes while byte 1 shows the Page Code and bytes 3–4 show the page length. Following this is shown the page data which involves the page length and number of bytes whereby byte 1 shows the Page Code 00 and byte 2 shows the Page Code of the next page supported. Byte x shows the page code of the last page supported, and so on.

Figure 7:
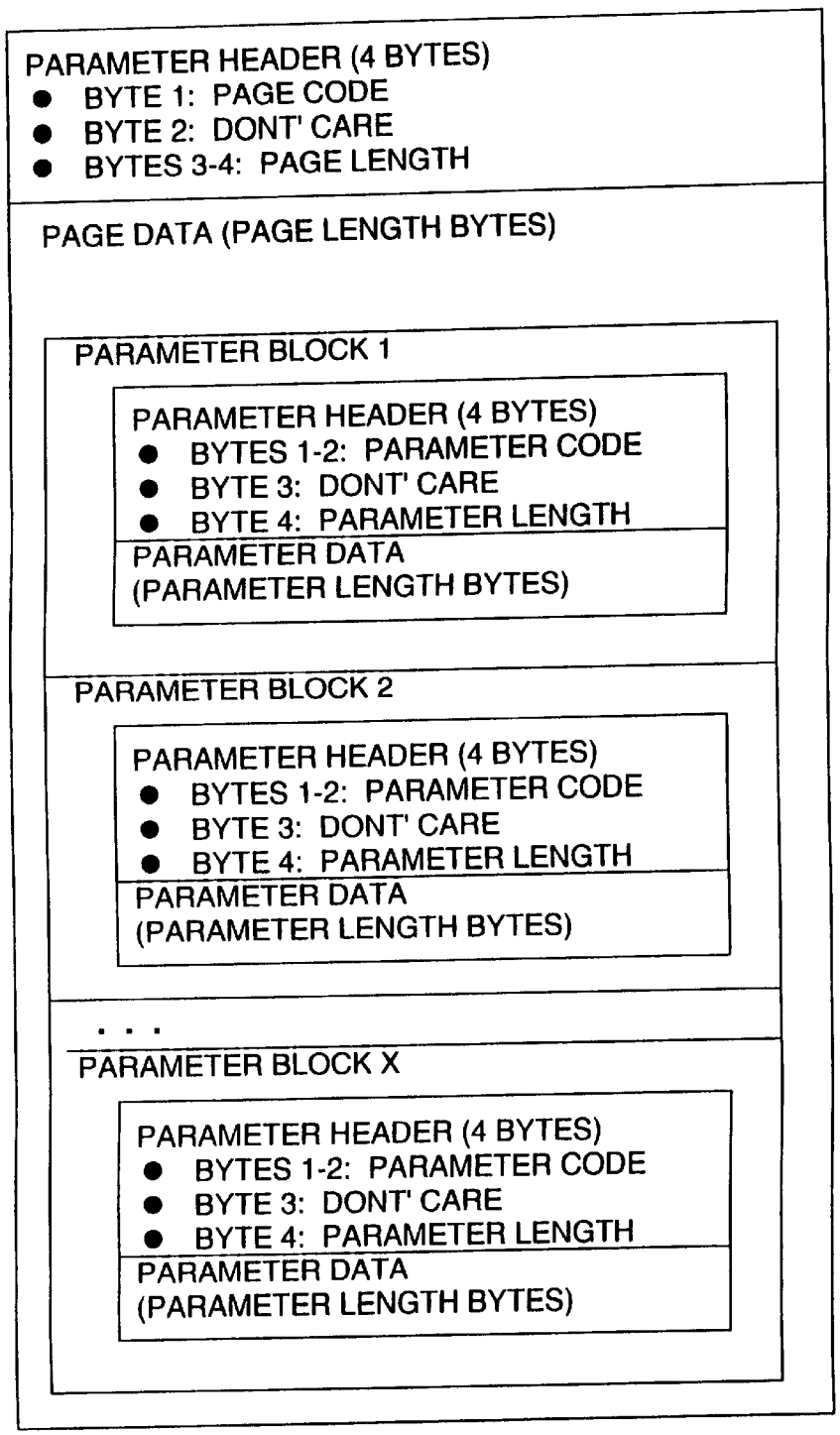
FIG. 7 shows the default format for pages other than page "00"

FIG. 7 is an illustration of the default format for all statistical data pages other than Page 00. Here there is seen the similar page header of 4 bytes with byte 1 showing the Page Code and bytes 3–4 showing the page length. Further, the page data is shown split up into various parameter blocks shown as parameter block 1, parameter block 2, - - - parameter block x.

FIGS. 8, 9 and 10 are typical examples of Log Sense Page information for a tape drive such as the OST5136. Here Page 00h shows supported pages and gives a list of pages supported by that particular type of tape drive. Further, Page 02h is the illustration of the Write Error Counter showing various parameter codes and their meanings.

FIG. 9 shows the page of parameter contents for Page 03h which involves the Read Error Counter. Each of the various parameter codes shown are then associated with a particular meaning which illustrates an analysis situation.

FIG. 10 shows the page and parameter contents for Page 0Ch which involves the Sequential Access Device where there is shown various parameter codes and the meaning attributed to each of the codes.

Additionally, in FIG. 10, the track error statistics are shown at Page 31h where the parameter code 90xxh indicates the number of ECC Correctable Read/Write errors detected on any particular track "xx." This involves 18 tracks which can be detected in one direction and 18 tracks which can be detected in the opposite direction.

Described herein has been a system and method whereby magnetic tape drive statistics, after being accumulated in a Sumlog file, can now be displayed and analyzed in formats which are meaningful to a User or to a field engineer. Utilization is made of a Loganalyzer program connected to a Jobformatter Library which arranges the output data for printout to a printer or display on a operator display terminal. The present system provides a new method for reporting statistical data in order to provide flexibility and completeness and report the data in the same format in all different types of SCSI Enhanced tape types. The output data can be parsed and displayed in a coherent manner for all different sets of SCSI tape types and the information can be easily analyzed by knowledgeable tape users based on the tape's product specification. Thus Read errors, Write errors, correctable errors and other statistical information can be looked at and analyzed in order to assess the operability and reliability of a magnetic tape drive system and its media.

What is claimed is:

1. A system for accessing and displaying magnetic tape statistical data retrieved from a magnetic tape media comprising:
   (a) means to access a file which stores magnetic tape statistical data;
   (b) means to display pages of statistical data which indicate informational parameters regarding said tape media and the peripheral Read/Write modules which utilize said tape media, said informational parameters including:
      (b1) a listing of the number of Write-errors on said tape media;
      (b2) a listing of the number of Write-errors which have been corrected by an error correction code algorithm;
      (b3) a listing of the number of Read-errors which occurred in reading out said tape media;
      (b4) a sequential listing of the particular pages being displayed;
      (b5) a listing of sequential access device information regarding the total Read/Write throughput;
      (b6) an indication of the tape peripheral cleaning statistic.

2. A method for accessing, analyzing and displaying magnetic tape statistics from a tape media comprising the steps of:
   (a) retrieving and storing tape statistical data onto a storage medium file;
   (b) invoking a LOGANALYZER program to parse said storage medium file to determine what information should be analyzed and displayed, said program including the steps of:
      (b1) extracting statistical data from said storage medium file;

(b2) reading out said storage medium file record, which includes the steps of:
  (b2a) determining that the storage medium file has more records to be read;
  (b2b) parsing said storage medium file to see if I/O informational tape statistics reside in a record;
  (b2c) if yes, then invoking a MAINTLOGEXCEPTION procedure in a Jobformatter unit to extract statistical data;
  (b2d) checking to sense whether any record has SCSI Enhanced tape statistical data;
  (b2e) calling a procedure (DUMP_LOGSENSE_DATA) to analyze and display statistical information;
(b3) completing the read-out until the depletion of said storage medium file;
(c) transferring the output of said LOGANALYZER program to a Jobformatter for precise analysis and display in a specialized format.

3. The method of claim 2, wherein step b2e includes the steps of:
  (i) selecting a supported page of statistical data;
  ((ii) printing the supported page numbers;
  (iii) dumping out the statistical information for each supported page.

* * * * *